(12) United States Patent
Brodziak (10) Patent No.: US 9,976,627 B2
(45) Date of Patent: May 22, 2018

(54) BLOCK LOCK WITH A TWIST LOCK

(71) Applicant: THIELE GMBH & CO. KG, Iserlohn (DE)

(72) Inventor: Eugeniusz Brodziak, Iserlohn (DE)

(73) Assignee: THIELE GMBH & CO. KG, Iserlohn (DE)

(*) Notice: Subject to any disclaimer, the term of this patent is extended or adjusted under 35 U.S.C. 154(b) by 0 days. days.

(21) Appl. No.: 15/325,671

(22) PCT Filed: Jul. 8, 2015

(86) PCT No.: PCT/DE2015/100285
§ 371 (c)(1),
(2) Date: Jun. 19, 2017

(87) PCT Pub. No.: WO2016/004923
PCT Pub. Date: Jan. 14, 2016

(65) Prior Publication Data
US 2017/0314642 A1    Nov. 2, 2017

(30) Foreign Application Priority Data
Jul. 11, 2014  (DE) ............... 20 2014 103 197 U (51) Int. Cl.
*F16G 15/04*    (2006.01)
*F16G 15/02*    (2006.01)

(52) U.S. Cl.
CPC ............. *F16G 15/04* (2013.01); *F16G 15/02* (2013.01)

(58) Field of Classification Search
CPC ................. F16G 15/04; F16G 15/02

USPC ........................................ 59/85, 86
See application file for complete search history.

(56) References Cited

U.S. PATENT DOCUMENTS

| 1,672,867 | A |   | 6/1928 | Bazeley et al. |
| 1,979,069 | A |   | 10/1934 | Hancock |
| 4,179,878 | A |   | 12/1979 | Albertini |
| 6,021,634 | A | * | 2/2000 | Brodziak ............... F16G 15/02 59/85 |
| 7,690,183 | B2 | * | 4/2010 | Mulle .................... F16G 15/02 59/84 |

FOREIGN PATENT DOCUMENTS

| CN | 2385967 | 7/2002 |
| CN | 1712753 | 12/2005 |
| CN | 101395402 | 3/2009 |

(Continued)

*Primary Examiner* — David B Jones
(74) *Attorney, Agent, or Firm* — Jacobson Holman, PLLC.

(57) ABSTRACT

The invention relates to a block lock for connecting two chain ends which comprises two block lock halves which extend in the longitudinal direction and which engage with each other in a positive fit via pins and grooves and lock to form two seating openings, each one to receive a chain link. The seating openings are separated by a crossbar which extends from one of the block lock halves to the opposite block lock half, wherein the block lock halves are coupled so as to rotate about the crossbar and/or on an end of a block lock half, a pin which protrudes in the direction of the opposite block lock half, which engages laterally in one lateral seating groove formed on one end of the opposite block lock half, when carrying out a relative rotational movement of both block lock halves.

11 Claims, 5 Drawing Sheets

(56) References Cited

FOREIGN PATENT DOCUMENTS

| | | |
|---|---|---|
| DE | 7213599 | 8/1972 |
| DE | 19743025 | 5/1999 |
| FR | 597566 | 11/1925 |

* cited by examiner

BLOCK LOCK WITH A TWIST LOCK

BACKGROUND OF THE INVENTION

This invention relates to a block lock for connecting two chain ends according to the features in the preamble of claim 1.

Connecting the ends of chains, in particular of round steel link or flat link chains, together by means of a chain lock in order to provide a chain sling for a respective application case is known from the prior art. Such a chain lock is also called a block lock or a chain block lock for connecting link chains that in particular are configured as round steel link or flat link chains. Such a lock for connecting two link chains shall henceforth be called a block lock.

Such a block lock is disclosed in, for example, DE 197 43 025 C1. Accordingly, two block lock halves, which extend substantially in the longitudinal direction as longitudinal bodies, wherein the longitudinal direction of the body extends in the longitudinal direction of the chain, are inserted into one another so that they lock to form two seating openings for a respective terminal chain link.

To this end, the respective terminal chain links are inserted in a lock half and the block lock is locked by inserting the two lock halves into one another.

BRIEF SUMMARY OF THE INVENTION

On the basis of the prior art, the object of this invention is that of providing a block lock that has a higher loading capacity and that is optionally easier to manipulate compared to prior art block locks.

The aforementioned objects are achieved with a block lock for connecting two chain ends according to the features in claim 1.

Advantageous design variants of this invention are the subject of the dependent claims.

The block lock for connecting two chain ends, wherein the block lock has two opposite block lock halves extending in the longitudinal direction. Which halves interlockingly engage in one another by means of pins and grooves and lock, forming two seating openings for receiving a chain link. The seating openings are separated from one another by a crossbar extending from one block lock half to the opposite block lock half. The block lock halves are coupled for rotation via the crossbar and/or a pin projecting in the direction of the opposite block lock half is formed on one end of the block half. The pin engages laterally in a lateral seating groove formed on the end of the opposite block lock half during a rotary movement of both block lock halves relative to each other.

The block lock according to the invention is thus distinguished in particular by the fact that the two block lock halves execute a rotary movement relative to each other, wherein this relative rotary movement is in particular performed about a perpendicular to the longitudinal axis of the block lock. Hence the two block lock halves, in the unlocked state, have an X-shaped appearance when viewed from above, wherein the corresponding lateral seating grooves and pins come into interlocking engagement by carrying out the relative rotary movement about the perpendicular. The perpendicular is in particular configured as a high axis, about which the two block lock halves are mounted rotatably relative to each other, in particular mounted rotatably. Particular preference is given to the perpendicular being centered in the block lock in relation to the longitudinal direction and/or transverse direction.

Another special advantage is the fact that the pins are each inserted into the side of the opposite block lock half and are interlocked therein. In particular the manipulation of the block lock for connecting the two chain ends is thus simplified and the load bearing capacity is thus simultaneously increased by the locking according to the invention. To this end, particular preference is given to the pins and the lateral seating grooves each having a curved configuration in the transverse direction to the block lock. Owing to the curved configuration, the rotary movement and consequently the lateral insertion of the pin into the lateral seating groove is possible, with the available contact surfaces between the pin and the lateral seating groove being simultaneously fully exploited.

For carrying out the rotary movement, the block lock halves are preferably divided along a longitudinal mid-plane in such a way that in the zone of the longitudinal mid-plane, the two crossbars of the opposite block lock halves come to rest on contact surfaces and a bolt, which shall henceforth be called a pivot bolt, is integrated between them. The bolt can be configured as a locking pin and inserted in a respective seating opening of the crossbar. Inserting the bolt in the respective crossbar with, for example, a catch means, in particular with a lock washer, so that it is initially connected to the crossbar in an undetachable manner would also be conceivable. Coupling the two block lock halves together for rotation about the pivot bolt by means of, for example, a spring bar such that the two block lock halves are coupled together for rotation, but nevertheless in an undetachable manner, is also conceivable. This gives rise to the advantage that a technician using the device does not have to hold both block lock halves apart again. It is also conceivable for the pivot bolt to be integrally formed on a block lock half, in particular as a single piece and of the same material, and insertable in a corresponding seating opening on the opposite block lock half. This would also give rise to the advantage that two block lock halves can always be easily joined to each other.

Particular preference is given to a pin and a lateral seating groove being formed on each end of the block lock, wherein the respective pin is seated in the lateral seating groove in an interlocking manner by means of lateral in-turning when the block lock is locked.

To this end, there are two possible embodiments of the block lock according to the invention.

A first embodiment makes provision such that both pins are formed on one block lock half and the two lateral seating grooves are then formed on the opposite block lock half. However, owing to the rotary movement of the two block lock halves relative to each other, the lateral seating grooves are formed on opposite side surfaces of the block lock half with the lateral seating grooves such that one pin will be inserted into the lateral seating groove on one side surface and the other pin will be inserted into a lateral seating groove on the opposite side surface by a rotary movement.

A second variant makes provision such that a pin is formed on one end of one block lock half and a lateral seating groove is formed on the opposite end of the same block lock half. The other block half is also configured, in a corresponding manner, with a pin on one end and a lateral seating groove on the opposite end. In this case the two block lock halves could in particular be configured identically, wherein owing to the opposite arrangement as well as the lateral twisting, a respective interlocking connection is formed.

The lateral seating groove is recessed relative to the other block lock half, in particular with respect to the end and in particular to a contact surface. For the further improvement of a secure interlocking engagement, particular preference is given to the pin widening towards its end. The lateral seating groove has an undercut corresponding to the widened pin end such that in particular, the block lock halves cannot move apart transversely to the longitudinal direction of the chain, in particular transversely to an upper surface and/or bottom surface of the block lock. This is brought about in particular by the undercut, which forms an attachment in an interlocking manner perpendicular to the longitudinal direction of the chain.

It is also conceivable for the pin to have two flarings or widenings or a plurality of flarings and/or widenings on its end. These two, three, or more widenings of the pin end are also encountered in a corresponding manner in the lateral seating grooves. The pin can have a contoured configuration in cross section, either optionally with widening or without any widening. This configuration can be shaped as, for example, wave-shaped or zigzag. The inner lining surface of the lateral seating groove is configured with a corresponding inner configuration such that the outer lining surface of the pin and the inner lining surface of the lateral seating groove engage with each other in an interlocking manner. The multiple widenings and/or the wave-shaped or zigzag configuration in particular confer the advantage, as does only one widening of the pin end, of optimizing the load on the chain lock in the vertical direction such that, owing to the interlocking of the configuration, an opening or separation of the two interlocked block lock halves in the vertical direction is prevented.

In order to maintain the block lock in the locked state, further provision is made for the insertion of two securing bolts, in particular of two spring pins. The securing bolts extend perpendicular to the longitudinal direction of the block lock and in particular are inserted via a side surface or via an upper surface or lower surface. To this end, the securing bolt is held in a securing bolt receptacle in the block lock.

The securing bolt receptacle is configured in such a way that approximately one half thereof is formed by one block lock half and the other half thereof is formed by the other block lock half. To this end, the securing bolt is inserted into a securing bolt receptacle that is at least partially formed in the pin and in other parts of the corresponding lateral seating groove.

An unintentional opening of the block lock is prevented by the fact that the chain links of the respective chain end to be seated each hold the pin in the lateral seating groove by their shanks. Because it is surrounded by the chain link, the pin cannot be moved laterally out of the lateral seating groove. However, this does not mean that the lateral shanks of the respective chain link are in direct contact with the block lock. As much as several millimeters of play is possible. However, the pin is prevented from being removed completely from the lateral seating groove. To unlock or to lock the block lock in the first place, the chain links are swiveled into the seating openings in such a way that in each case they only show above one block lock half, in order to enable the rotary movement of the block lock halves and the insertion or retraction of the pin into or out of the lateral seating groove associated therewith.

Particular preference is given to the pins as well as the lateral seating grooves having a curved configuration in the transverse direction of the respective block lock half. The radius of the curved configuration approximately corresponds to the distance from the center point of the pins or lateral seating grooves to the rotation axis or center point of the pivot bolt. When the rotary movement is carried out, the pin can be screwed into the lateral seating groove and the greatest available contact surface between the outer lining surface of the pin and the inner lining surface of the lateral seating groove can simultaneously be used for transmitting a pulling force, which increases the load bearing capacity of the block lock.

The block lock halves are preferably made as metal components, in particular out of a steel alloy. The block lock halves are preferably made as cast components and/or forged components.

BRIEF DESCRIPTION OF THE SEVERAL VIEWS OF THE DRAWINGS

Other advantages, features, characteristics, and aspects of this invention are the subject matter of the following description. Preferred variants of embodiments are illustrated in the schematic figures. The purpose of the latter is to make the invention easily understood. Shown are.

DETAILED DESCRIPTION OF THE INVENTION

In the figures, the same reference signs are used for the same or similar components, although the description may not be repeated for the sake of simplification.

Figure 1:
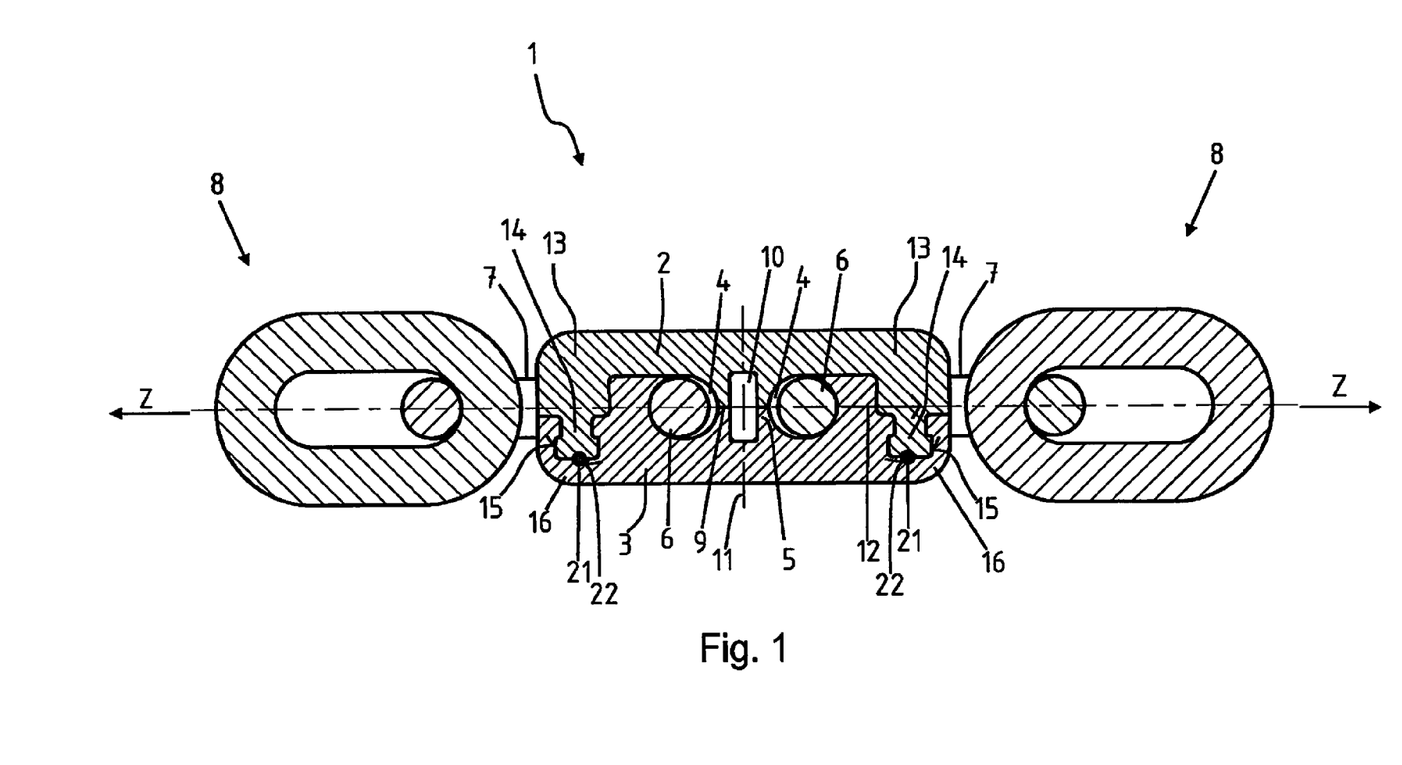
FIG. 1 shows the block lock according to the invention in a longitudinal sectional view, with two ends of a chain engaged.

FIG. 1 shows a longitudinal sectional view of a block lock 1 according to the invention. The block lock 1 has an upper block lock half 2 as well as a lower block lock half 3 that engage with each other in an interlocking manner. On the inside the two block lock halves 2, 3 thus form two seating openings 4, which are coupled together by a two-part crossbar 5. A chain link 7 of an end of a respective chain 8 is seated with its rounded portion 6 in a respective seating opening 4 such that the latter are connected to each other in the pulling direction Z of the chain 8. In this embodiment, in each case one half of the two-piece crossbar 5 is formed by the upper block lock half 2 and by the lower block half 3, wherein the latter are divided in the crossbar 5 along a longitudinal mid-plane 9, where they come into interlocking contact. A pivot bolt 10 is integrated in an interlocking manner in the crossbar 5, wherein the pivot bolt 10 defines a rotation axis 11 that is arranged perpendicular to the longitudinal direction 12 of the block lock 1. The upper block lock half 2 and the lower block lock half 3 are mounted for rotation about the rotation axis 11 such that they can be brought into or released from lockable engagement. Extending in the direction toward the lower block lock half 3, pins 14 are formed on the ends 13 of the upper block lock half 2 so that the upper block lock half 2 and the lower block lock half 3 engage in each other in an interlocking manner in the locked engagement illustrated in FIG. 1. The pins 14 are seated in an interlocking manner in lateral seating grooves 15, which are located in ends 16 of the lower block lock half 3.

Figure 2:
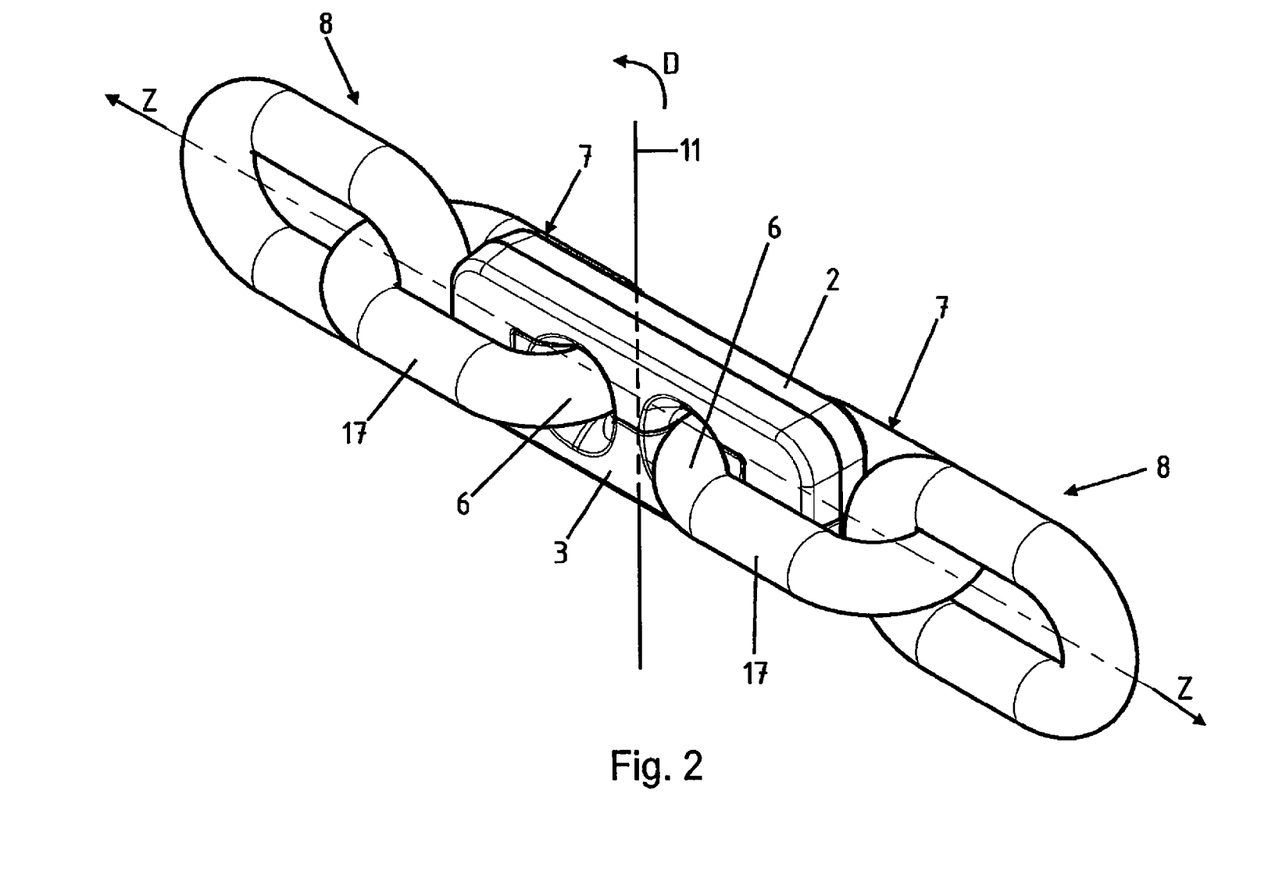
FIG. 2 shows the block lock in a perspective view.

FIG. 2 illustrates the locked engagement more clearly, where in the seated chain links 7 each surround the pins 14 laterally by their shanks 17 and, in the locked state, prevent rotary movement D about the rotation axis 11 and, during the operation, of the chain 8 connected to the block lock 1.

The inventive principle of the twistable engagement is illustrated even more clearly in FIGS. 3 and 4. With reference to FIGS. 4A) and B), the respective lateral seating groove 15 with an opening 18 is formed on opposite side surfaces 19 on the lower block lock half 3 illustrated therein. A rotary movement D can thus be performed about the rotation axis 11 such that the pins 14 of the upper block lock half 2 illustrated in FIGS. 3A), 3B), and 3C) are each inserted, in an interlocking manner, into the lateral seating groove 15 via the opening 18. In particular so that the rotary movement D can be carried out in a controlled and guided manner, in each case a seating opening 20 is provided in a part of the crossbar 5 for receiving the pivot bolt 10 illustrated in FIG. 1.

In particular so that an interlocking engagement with simultaneously high tensile loading and increased load bearing capacity can be established between the pins 14 and the lateral seating grooves 15, the latter have a curved configuration 30 in the transverse direction Q.

Figure 5:
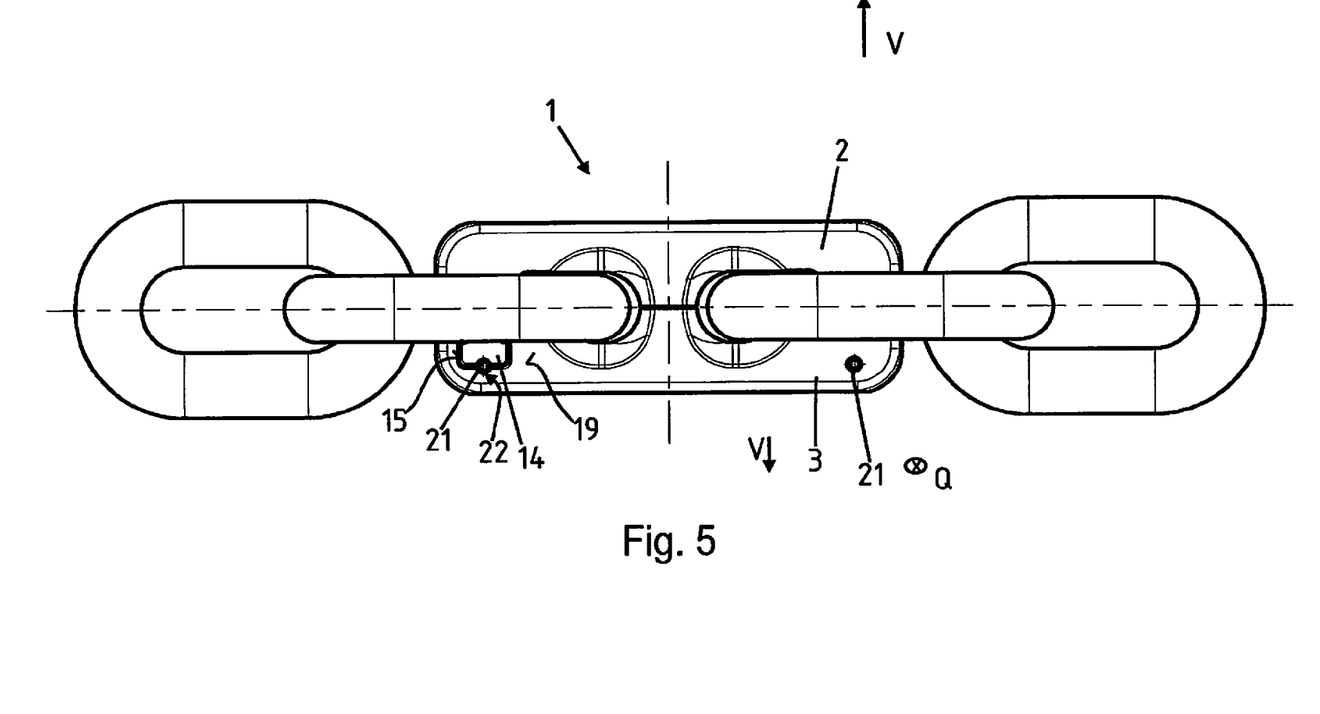
FIG. 5 shows a side view of the block lock of the invention.

FIG. 5 shows a side view of the block lock 1 according to the invention, in which it is again evident that the left, with respect to the image plane, pin 14 is inserted into a lateral seating groove 15. Not illustrated is the engagement of a pin engaging behind, with respect to the image plane, the block lock, which pin is inserted into the side surface behind the image plane, into the lower block lock half 3. Two securing bolts 21 are employed for maintaining the block lock 1 in the locked state, wherein said securing bolts 21 are inserted in the block lock 1, specifically in the transverse direction thereto, wherein with respect to the longitudinal section illustrated in FIG. 1, half of a securing bolt receptacle 22 is formed in the pin 14 and in the lateral seating groove 15, respectively.

Figure 3A:
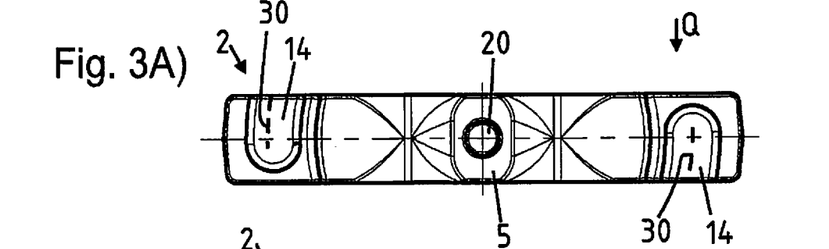
FIG. 3 consists of Figures A-D and shows an upper block lock half in various views.
Figure 3B:
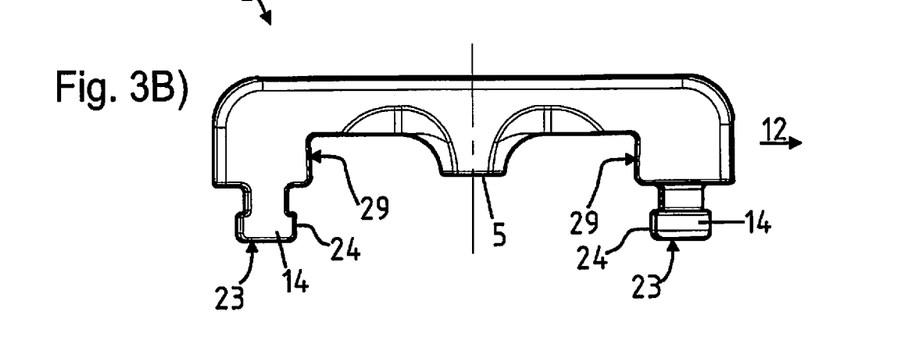
Figure 3C:
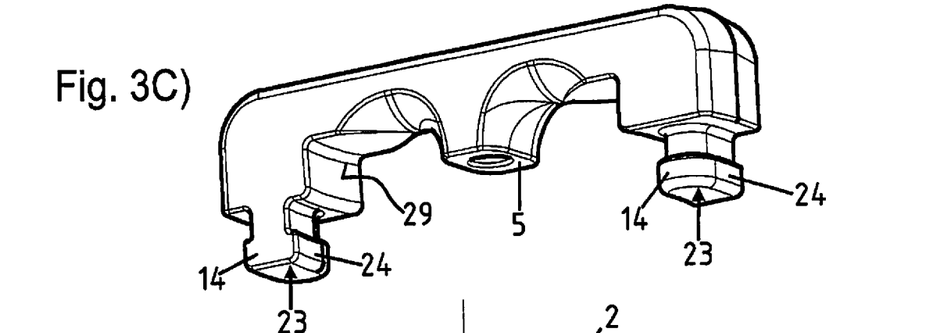
Figure 3D:
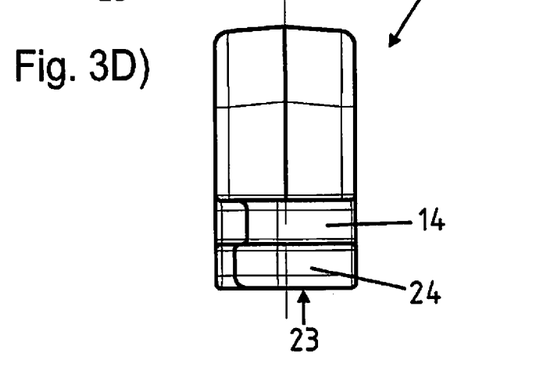
Figure 4A:
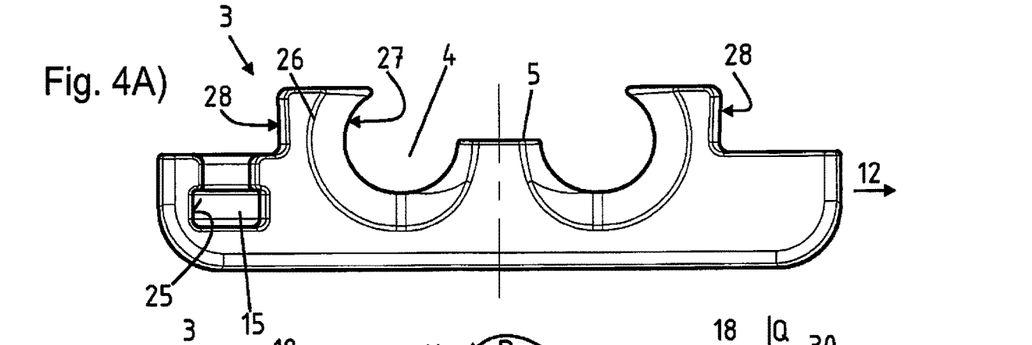
FIG. 4 consists of Figures A-D and shows a lower block lock half in various views.
Figure 4B:
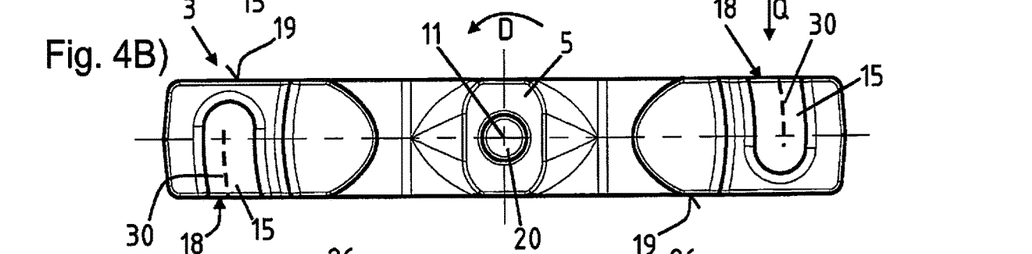
Figure 4C:
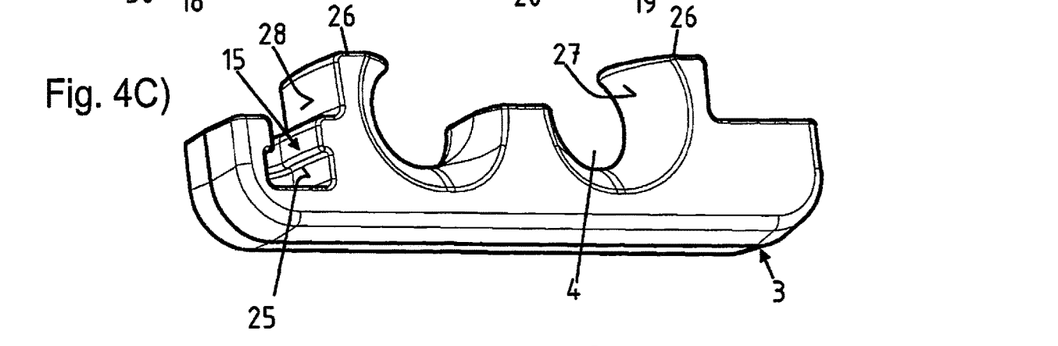
Figure 4D:
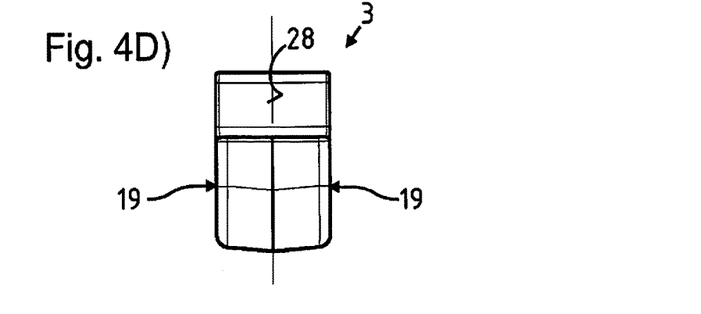

In the illustration according to FIGS. 3B) and C), it is furthermore clearly discernible that the pin 14 has, on its pin end 23, a widening 24 that according to FIG. 3A) preferably also has a curved configuration 30, wherein the widening 24 correspondingly engages in an interlocking manner in an undercut 25 according to FIGS. 4A) and 4C) of the lateral seating groove 15. In particular the two block lock halves 2, 3 are prevented from shearing off from each other in the vertical direction V, according to FIG. 5. In FIG. 4C) in particular, it is again shown that the resulting seating openings 4 are formed by a respective crossbar base 26 with a contact surface 27, on which the inner side of the rounded portion 6 of the respectively seated chain link 7 comes to rest, wherein the crossbar base 26 then, as illustrated in FIG. 4A, has a back surface 28, behind which a supporting surface 29 of the upper block lock half 2 interlockingly engages in the longitudinal direction.

For locking and unlocking, the chain links 7 illustrated in FIG. 2, which are engaged in each case they are pivoted with respect to the block lock 1 in such a way that the rotary movement D about the rotation axis 11 can be performed, thereupon withdrawing the chain links 7 or pulling the block lock halves 2, 3 apart in the vertical direction V.

REFERENCE SIGNS

1—block lock
2—upper block lock half
3—lower block lock half
4—seating opening
5—crossbar
6—rounded portion of 7
7—chain link
8—chain
9—longitudinal mid-plane
10—pivot bolt
11—rotation axis
12—longitudinal direction of 1
13—end of 2
14—pin
15—lateral seating groove
16—end of 3
17—shank of 7
18—opening of 15
19—side surface of 3
20—seating opening
21—securing bolt
22—securing bolt receptacle
23—pin end
24—widening
25—undercut
26—crossbar base
27—contact surface
28—back surface
29—supporting surface
30—curved configuration
Z—pulling direction
D—rotary movement
Q—transverse direction
V—vertical direction

The invention claimed is:

1. A block lock for connecting two chain ends, wherein the block lock has a first and a second block lock halves extending in a longitudinal direction which engage in an interlocking manner to form two seating openings for receiving chain links, wherein the first block lock half comprises a first crossbar half, the second block lock half comprises a second crossbar half and the first and second crossbar halves form a two-part cross bar; wherein the seating openings are separated from one another by the two-part crossbar extending from the first block lock half to the second block lock half, wherein the first and second block lock halves are rotatably coupled via the crossbar and a pin projecting in a direction of the second block lock half is formed on each of ends of a first block lock half, which pin engages laterally in a lateral seating groove formed on respective end of the second block lock half during a rotary movement of both the first and second block lock halves relative to each other, wherein each lateral seating groove has an opening in a side surface, which is parallel to both the longitudinal direction and a direction in which the two-part cross bar extends, for swiveling on the pin and the openings are formed on opposite side surfaces of the second block lock half.

2. The block lock according to claim 1, wherein the block lock halves are detachably coupled to each other at the crossbar by means of a pivot bolt.

3. The block lock according to claim 1, wherein the block lock halves are mounted for rotation about a perpendicular to the longitudinal direction of the block lock.

4. The block lock according to claim 1, wherein on its pin end, the pin has a widening and the lateral seating groove has an undercut for receiving the widening.

5. The block lock according to claim 1, wherein, in the locked state, the two block lock halves are locked together by at least one securing bolt.

6. The block lock according to claim 5, wherein the securing bolt is a spring pin.

7. The block lock according to claim 5, wherein the securing bolt is inserted perpendicular to the longitudinal direction of the block lock.

8. The block lock according to claim 7, wherein the securing bolt is inserted into a securing bolt recess via the side surface, a top surface and/or a bottom surface of the block lock.

9. The block lock according to claim 8, wherein the securing bolt recess is half-formed in each block lock half.

10. The block lock according to claim 8, wherein the securing bolt recess is arranged in the pin and in the corresponding lateral seating groove.

11. The block lock according to claim 1, wherein the pins and the lateral seating grooves have a curved configuration in the transverse direction.

\* \* \* \* \*